United States Patent

[11] 3,624,296

[72] Inventors William H. Slavik
Oak Lawn, Ill.;
Carl E. Snyder, Mountain View, Calif.
[21] Appl. No. 860,216
[22] Filed Sept. 23, 1969
[45] Patented Nov. 30, 1971
[73] Assignee Motorola, Inc.
Franklin Park, Ill.

[54] BURST-CONTROLLED OSCILLATOR CIRCUIT
9 Claims, 1 Drawing Fig.

[52] U.S. Cl. .......... 178/69.5 CB, 178/5.4 SY, 331/60, 331/109
[51] Int. Cl. .......... H04n 9/46
[50] Field of Search .......... 178/69.5 CB, 5.4 SY, 5.4 CK, 5.4 SD; 331/60, 109

[56] References Cited

UNITED STATES PATENTS

| | | | |
|---|---|---|---|
| 2,879,390 | 3/1959 | Preisig | 178/69.5 |
| 2,948,774 | 8/1960 | Singleback | 178/69.5 |
| 3,012,094 | 12/1961 | Smith, Jr. et al. | 178/69.5 |
| 3,239,776 | 3/1966 | Shaw | 331/109 |
| 3,424,999 | 1/1969 | Spies | 178/69.5 |
| 3,502,800 | 3/1970 | Slavik | 178/5.4 |

*Primary Examiner*—Richard Murray
*Assistant Examiner*—P. M. Pecori
*Attorney*—Mueller & Aichele

ABSTRACT: A multistage, crystal-controlled oscillator circuit for a color television receiver provides, from an intermediate stage, a control signal indicative of the presence or absence of burst components in the received signal, with this control signal being utilized to provide ACC and color killer controls for the color television receiver. A feed-forward circuit is provided for the final stage of the oscillator, so that the output signal level obtained from the final stage remains constant, and a provision is made for providing noise immunity of the circuit during both the presence and absence of received burst signal conditions.

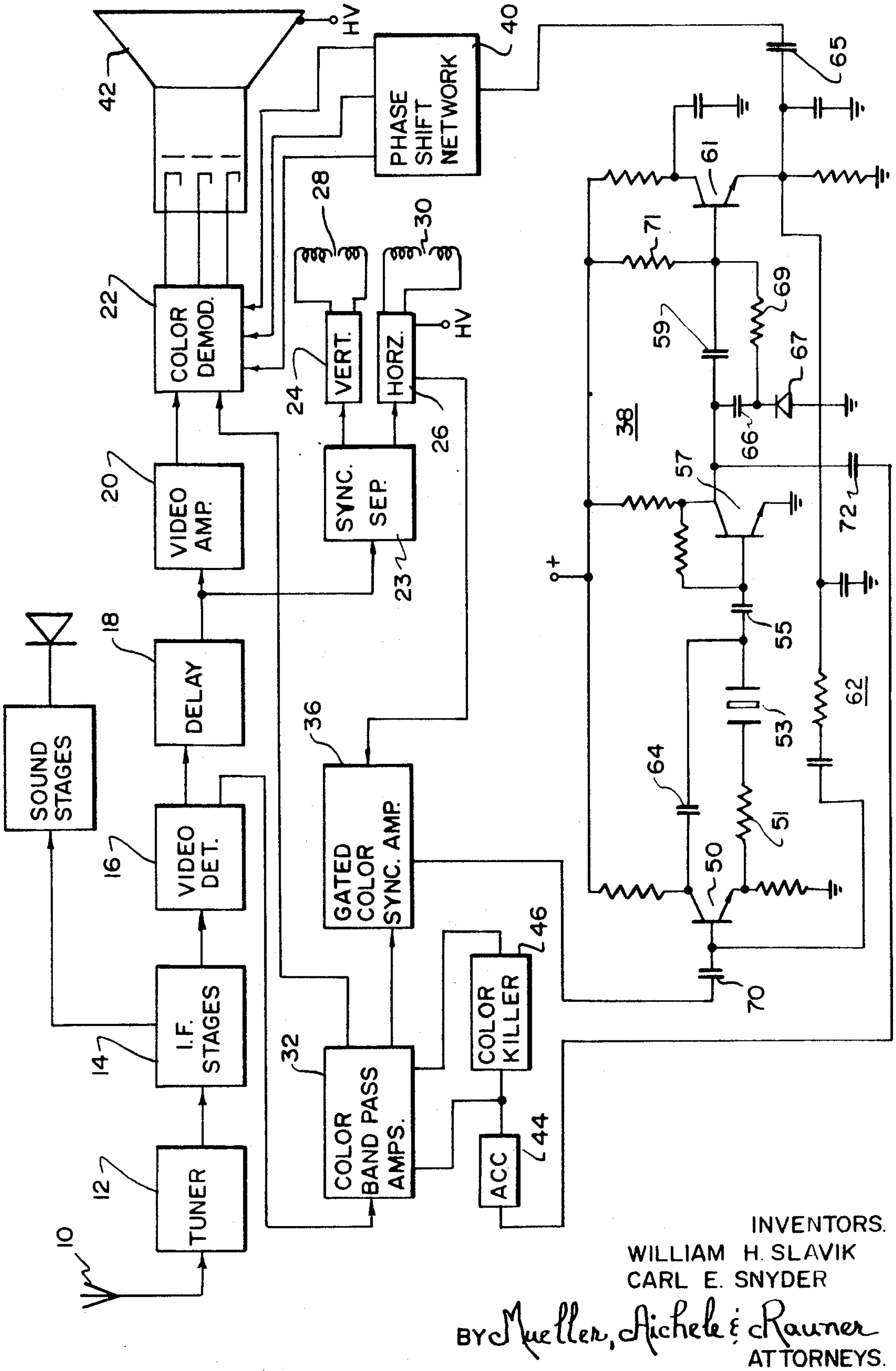
INVENTORS.
WILLIAM H. SLAVIK
CARL E. SNYDER
BY Mueller, Aichele & Rauner
ATTORNEYS.

BURST-CONTROLLED OSCILLATOR CIRCUIT

BACKGROUND OF THE INVENTION

The NTSC color television signal is composed of a color information signal component, phase and amplitude modulated on a subcarrier; a brightness signal component, and a burst signal component synchronized with the color information subcarrier. In the receiver, the burst signal component is separated from the remainder to the television signal and is used to generate a reference signal. Three phases of the reference signal then generally are used to demodulate the color information signal component along predetermined angles to produce separate video voltages representing red, blue and green. When these voltages are applied to a tri-gun cathode ray tube, a color image is reproduced in a manner which is well known. In order that the receiver does not produce incorrect saturations of the image, the reference signal must be maintained at a constant amplitude.

Since different transmitting stations transmit different amplitudes of the burst signal component, particularly noticeable affects are caused in receivers utilizing only the burst signal component directly to generate the reference signal. As a result, a separate oscillator circuit, phase-locked to the burst signal component generally is employed. It still is necessary, however, to provide a means for maintaining a constant signal level at the output of the oscillator irrespective of variations in the signal level of the burst signal component received.

In color television receivers it also is desirable to disable the band-pass color amplifying circuits which translate the color information component to the modulator in the absence of the burst signal component by the use of a color killer circuit. In addition, it is desirable to provide an automatic chroma control (ACC) to regulate the gain of the color band-pass amplifier circuits when color signals are being received.

SUMMARY OF THE INVENTION

Accordingly it is an object of this invention to provide an improved reference oscillator for generating a constant amplitude oscillatory signal.

It is an additional object of this invention to provide a phase-locked oscillator circuit providing a constant amplitude output signal and also providing, at an intermediate stage thereof, a variable amplitude output signal for controlling the operation of the color band-pass amplifier in a color television receiver.

It is a further object of this invention to provide noise-immunity for an oscillator circuit.

In accordance with a preferred embodiment of the invention, an oscillator circuit suitable for providing the 3.58 MHz. reference signal in a color television receiver includes an input amplifier stage with a crystal for controlling the frequency of oscillation of the oscillator placed in circuit between the input and output of the input amplifier stage. At the output of the input amplifier stage, the signal level varies in accordance with the presence or absence of a burst signal component being applied to the input of the input stage of the oscillator. This varying-level signal is applied to a feed-forward control circuit which is responsive thereto and which varies the gain of an output amplifier stage in accordance with variations in the signal level to maintain the output signal level of the output stage constant. The output of the input stage is AC coupled to the input of the output stage, with a feedback for sustaining oscillations being provided from the output stage to the input stage of the oscillator.

In order to improve noise immunity of the oscillator, an out-of-phase attenuated signal is supplied around the crystal to cancel any attenuated noise components passing through the crystal. The output of the input stage of the oscillator may be utilized to provide ACC and color killer control signals, since this output varies with the presence and absence of the burst component of a received color television signal.

BRIEF DESCRIPTION OF THE DRAWING

The sole figure of the drawing is a schematic diagram, partially in block form, of a preferred embodiment of the invention.

DETAILED DESCRIPTION

Referring now to the drawing, there is shown a color television receiver for receiving incoming television signals appearing on an antenna 10, with the signals being applied to a tuner 12 for receiving and converting the incoming television signals. The tuner 12 may include, for example, RF stages of the receiver as well as the first detector or mixer and associated oscillator. The output intermediate frequency signal developed by the tuner 12 is coupled through an intermediate frequency (IF) amplifier stage 14 to a video detector 16. The brightness components and the synchronizing components in the detected composite video signal then are delayed in a delay circuit 18, for purposes well known to those skilled in the art, are amplified by a video amplifier 20, and are applied to a color demodulator 22.

The synchronizing components are separated from the detected composite video signal in a synchronizing signal separator circuit 23 and are supplied to a vertical sweep system 24 and a horizontal sweep system 26. The sweep systems 24 and 26 develop the vertical and horizontal sweep signals in the vertical deflection windings 28 and the horizontal deflection windings 30, respectively.

The composite color signals, including the modulated subcarrier components and the burst signal components synchronized with the subcarrier components, are obtained from the video detector 16 and are translated through a color band-pass amplifier circuit 32. The color information signal components obtained from the output stage of the color band-pass amplifier circuit 32 then are applied to the input of the color demodulator circuit 22.

In addition, the composite signals are applied from an intermediate stage of the amplifier circuit 32 to a gated color sync. amplifier 36 which also is controlled by pulses from the horizontal sweep system 26 to conduct during the horizontal blanking intervals. Thus, the output of the gated color sync. amplifier 36 includes only the few cycles of the 3.58 MHz. burst signal component which exist during the blanking intervals. During the remainder of the time, no output is obtained from the color sync. amplifier 36. The gated color burst signal components are applied to the input of a 3.58 MHz. reference oscillator circuit 38 to synchronize the phase of operation of the oscillator 38 with the phase of the burst components.

The output of the oscillator 38 is applied to a phase shifting network 40, which develops reference signals at each of three different preselected phases for application to the color demodulator circuit 22 to combine with the brightness signal components from the video amplifier 20 and the color information components from the output of the color band-pass amplifier circuits 32 to produce the red, blue and green video voltages which cause a multigun cathode ray tube 42 to produce a color image.

In addition, an output is obtained from an intermediate stage of the oscillator circuit 38 and is applied to an ACC (Automatic Chroma Control) circuit 44 which controls the gain of the color band-pass amplifiers 32 during the operation of the system. The output of the ACC circuit 44 also is applied to a color killer circuit 46, which in turn controls the color band-pass amplifier circuit 32 to prevent or kill any output therefrom during a time when no burst signal component is being received, which is indicative of a monochrome reception. The operation of color killer circuits is well known and will not be explained here.

It is known that changes in the amplitude of the oscillatory reference signal obtained from the output of the reference oscillator will cause the demodulator circuit to produce output voltages which do not correspond to those in the transmitter, causing the image produced by the cathode ray tube to be of incorrect colors. As a result, it is desirable that the output signal from the oscillator be maintained at as constant a level as possible. The burst signal component in the composite color television signal, however, varies in amplitude from station-to-station; and since this component is applied to the input of the color reference oscillator to phase-lock the operation of the oscillator, the variations in the amplitude signal level of the burst component also may be reflected as changes in the amplitude of the output level of the oscillator.

At the same time, however, it is desirable to have a signal which corresponds to the amplitude of the burst component, so that ACC and color killer controls may be derived therefrom.

In order to provide a constant amplitude output signal from the oscillator and, in addition, to provide the necessary changing level signals for operating the ACC circuit 44 and the color killer circuit 46, the oscillator circuit 38 shown in detail in the drawing has been provided. Initially, assume that no burst components are present so that the free-running nature of the oscillator 38 may be considered.

The input stage of the oscillator 38 includes a first NPN-transistor 50, and assume that a transient, such as a positive going pulse, at the base of the transistor 50 initiates operation of the oscillator. A pulse of the same phase and approximately the same amplitude appears on the emitter of the transistor 50 which is coupled as an emitter-follower through a relatively low impedance resistor 51, a quartz crystal 53, the characteristics of which are chosen so that the crystal 53 passes basically only the 3.58 MHz. frequency information and attenuates all other frequencies, and a coupling capacitor 55 to the base of a second NPN-transistor 57, forming the second stage of the oscillator.

The pulse received at the base of the transistor 57 then includes substantially only the 3.58 MHz. frequency information since all other frequencies have been substantially attenuated by the crystal 53. The collector of the transistor 57 then provides a negative-going 3.58 MHz. pulse, that is a 180° phase shift in the 3.58 MHz. information appearing on the base of the transistor 50. The transistor 57 also provides substantial amplification of the pulse, and the collector of the transistor 57 is AC-coupled through a capacitor 59 to the base of an output NPN-transistor 61.

The output signals appearing on the emitter of the transistor 61 lag the signals on the collector of the transistor 57 by an additional 90° due to the circuit parameters, so that these signals then lag the input signals applied to the base of the transistor 50 by 270°. An RC-feedback network 62 is used to couple the emitter of the transistor 61 to the base of the transistor 50 and provides an additional 90° phase shift, so that the signal which is applied through the feedback network 62 to the base of the transistor 50 is phase shifted 360° from the original disturbance. As a consequence, oscillation occurs and is maintained at the 3.58 MHz. crystal frequency.

In order to provide even greater noise immunity to the circuit than that provided by the filtering action of the crystal 53 alone, a capacitor 64 is connected between the collector of the transistor 50 and the junction of the crystal 53 with the AC-coupling capacitor 55. Since the input to the crystal 53 is obtained from the emitter of the transistor 50, the signals applied through the capacitor 64 from the collector are 180° out-of-phase with the signals passed through the crystal 53. By selecting the capacitance of the capacitor 64 to match the value of the crystal capacitance, all signals appearing on the collector of the transistor 50 and passed by the capacitor 64 are equal to all signals, passed by the crystal 53 except those at the 3.58 MHz. resonant frequency of the crystal 53. The combination or addition of these equal out-of-phase signals passed by the capacitor 64 and the signals passed by the crystal 53 at the junction of the crystal 53 and the capacitor 64 results in a cancellation of all but the desired 3.58 MHz. signals. A small amount of attenuation of the desired 3.58 MHz. frequency signals also occurs, but the amount of attenuation is insignificant to the operation of the circuit. As a consequence, during all times of operation of the oscillator 36, substantial noise immunity is provided by the use of the capacitor 64 in the circuit.

In the oscillator circuit described thus far, the output signals obtained from the emitter of the output transistor 61 and applied through a coupling capacitor 65 to the input of the phase-shift network 40 can vary in amplitude, depending upon the variations in the amplitudes of the signals present in the oscillator circuit. In order to cause the output level of the signals on the emitter of the transistor 61 to be constant, a capacitor 66 is connected in series with a detector diode 67 between the collector of the transistor 57 and ground. The detector diode 67 conducts in varying amounts, depending upon the signal level on the collector of the transistor 57, with the capacitor 66 storing a varying charge indicative of the signal level. The junction of the diode 67 and the capacitor 66 is connected through a coupling resistor 69 to the base of the transistor 61, which also is connected through a resistor 71 to the source of positive operating potential for the oscillator circuit 38.

Considering now the operation of the detector circuit including the diode 67 and the capacitor 66, it should be noted that the polarity of the diode 67 is chosen to cause a relatively negative-going DC control potential to be applied to the base of the transistor 61 for increased conductivity of the transistor 57. The amplitude of this control potential is dependent upon the conduction of the transistor 57, and for higher signal levels the transistor 57 is more conductive, causing the average potential appearing on its collector to be more near ground potential. This lowers the potential appearing on the junction of the capacitor 66 and the diode 67, and appears as a less positive or negative-going bias voltage on the base of the NPN-transistor 61 to thereby reduce the gain of the transistor 61 accordingly. Conversely, whenever the transistor 57 is rendered less conductive due to a reduced signal level applied to the base thereof, the potential applied from the capacitor 66 and the diode 67 through the resistor 69 to the base of the transistor 61 is a more positive DC-biasing potential, thereby increasing the conductivity and the gain of the transistor 61 accordingly. The operation of this circuit causes the output signal level, coupled through the capacitor 65 to the phase shift network 40 to be constant for various levels of the collector voltage of the transistor 57. It also should be noted that since the feedback signal is obtained from the emitter of the transistor 61, the feedback level also is maintained constant by the operation of the detector circuit.

Now consider the operation of the oscillator 38 when a gated burst signal is applied to the input of the oscillator at the base of the transistor 50 through an AC-coupling capacitor 70. The burst voltage is greater than the oscillator level of the feedback signal at the base of the transistor 50, so that the phase of the burst voltage controls the phase of the oscillator signal applied through the transistor 50 to the crystal 53 in a manner similar to other gated or phase-locked oscillators.

Because the burst signal component is at a higher level than the feedback signal of the oscillator operating in its free-running mode, the input to the base of the transistor 57 is increased over the input signal level for the oscillator 38 in the free-running mode. This results in a collector signal increase on the collector of the transistor 57, and this increase remains through the remainder of the line scanning interval due to the ringing of the crystal 53 in response to the application of the burst signal component. As a consequence, an increased signal level, that is a signal level the average level of which is closer to ground potential, is coupled through a coupling capacitor 72 from the collector to the transistor 57 to the ACC control circuit 44, from which the ACC and color killer control potentials may be derived in a suitable manner. At the same time, however, the operation of the detector circuit consisting of the capacitor 66 and the diode 67 maintains the output signal level on the emitter of the output transistor 61 constant even though the burst signal components are present. Thus, the oscillator circuit 38 permits the obtaining of a signal proportional to the burst component for operation of the ACC and color killer circuits and still provides a constant signal level at the oscillator output coupled to the phase shift network 40.

Using the oscillator 38 in a color television receiver provides a number of advantages, some of which have been enumerated above. The circuit, in addition, is easily adaptable for integrated circuit application, and even constructing the oscillator circuit 38 of discrete components represents a substantial cost saving over conventional color reference oscillator circuits which use a high Q-tank circuit for determining the oscillator frequency. Because no tank circuit is utilized in the oscillator circuit 38, a substantial labor saving is achieved by the omission of the need for tuning the oscillator circuit in the production of the television receiver. The circuit also exhibits a greater free-running accuracy and stability than is achieved with a conventional tank-type oscillator circuit and has less need for temperature and line compensation.

The noise immunity provided by the capacitor 64 is present during both burst and no-burst conditions, further enhancing the desirable operating characteristics of the oscillator circuit. Although a quartz crystal has been described as the frequency-determining device, other frequency-determining devices exhibiting comparable operating characteristics could be used.

What is claimed is:

1. An oscillator circuit including in combination:

an input amplifier stage having an input and an output and producing a first output signal subject to variations of signal level;

an output amplifier stage having an input and an output;

a tuned circuit including crystal means for establishing the frequency of operation of the oscillator coupled with the output of the input amplifier stage, the crystal means providing a low impedance path for signals of said frequency of operation and substantially attenuating signals at all other frequencies;

attenuating means coupled with the output of the input amplifier stage for providing attenuated signals substantially 180° out-of-phase with signals passed by the crystal means, the out-of-phase signals being attenuated in an amount substantially equal to the attenuation imparted to signals of all of said other frequencies by the crystal means;

means coupled with the input of the output amplifier stage for combining the 180° out-of-phase attenuated signals with the signals passed by the crystal means to form the input for the output amplifier stage of the oscillator;

a feedback circuit coupled between the output of the output amplifier stage and the input of the input amplifier stage to provide a feedback signal from the output amplifier stage to the input amplifier stage for sustaining oscillations in the oscillator; and control means responsive to the variations of signal level of the first output signal and coupled to the output stage for maintaining the signal level on the output of the output amplifier stage substantially constant.

2. The combination according to claim 1 wherein the output amplifier stage includes at least one transistor having base, emitter and collector electrodes, with the first output signal from the input amplifier stage being AC coupled with the base electrode of the transistor, and wherein the control means varies the DC bias on the base of the transistor to control the gain thereof in accordance with variations in the level of the first output signal.

3. The combination according to claim 2 wherein the output amplifier stage includes a second transistor having base, collector and emitter electrodes and the first output signal from the input amplifier stage is coupled with the base of the second transistor, with the collector electrode of the second transistor being capacitively coupled to the base electrode of the first transistor, and wherein the control means includes a detector coupled to the collector of the second transistor for developing a DC control voltage coupled to the base of the first transistor.

4. The combination according to claim 3 wherein the detector circuit comprises a capacitor and a diode coupled together at a junction in circuit between the collector of the second transistor and a source of reference potential, with resistor means coupled from the junction to the base of the first transistor.

5. The combination according to claim 1 wherein the attenuating means includes capacitor means, the capacitance of which is chosen to provide substantially the same amount of attenuation to signals passed thereby as is provided to all signals except those at said frequency of operation by the crystal means.

6. In a color television receiver for a composite color television signal having brightness components, a color information signal component phase and amplitude modulated on a subcarrier, and a burst signal component in synchronized relation to the subcarrier, a color band-pass amplifier for amplifying the color information signal component, a burst separator circuit for deriving the burst signal component from the composite television signal, a color demodulator circuit responsive to at least the color information signal components and to a reference signal for developing color signals, an oscillator circuit for developing the reference signal including in combination:

a first amplifying stage producing an output subject to variation in signal level amplitude;

a second amplifying stage coupled to the output of the first amplifying stage for producing output signals comprising said reference signal;

feedback means from the output of the second amplifying stage to the input of the first amplifying stage for sustaining oscillations in said oscillator circuit at a frequency which is substantially the frequency of the burst signal component;

means coupled to the burst separator circuit for providing an input oscillatory signal at the frequency of the burst signal component to the input of the input amplifier stage to phase-lock the oscillations of the oscillator circuit to the phase of the burst signal component, the amplitude of the output of the first amplifying stage being substantially increased in the presence of the burst signal component;

control means responsive to the signal level at the output of the first amplifying stage for applying a control potential to the input of the second amplifying stage to cause the output of the second amplifying stage to remain substantially constant in amplitude;

means coupled with the output of the first amplifying stage for obtaining and applying a variable control voltage to the color band-pass amplifier for controlling the operation thereof.

7. The combination according to claim 6 wherein the control voltage applied to the color band-pass amplifier varies the gain thereof in accordance with the amplitude of the signal level at the output of the first amplifier stage of the oscillator.

8. The combination according to claim 6 wherein the first amplifying stage includes at least a first transistor having base, collector, and emitter electrodes; wherein the output amplifying stage includes a second transistor having base, collector and emitter electrodes, with the collector electrode of the first transistor being AC-coupled with the base electrode of the second transistor, and with the feedback means being coupled from an electrode of the second transistor other than the base electrode thereof with the base electrode of the first transistor; and wherein the control means is coupled to the collector electrode of the first transistor for developing a DC control potential, with the DC control potential being coupled with the base electrode of the second transistor.

9. The combination according to claim 8 wherein the first amplifying state includes a third transistor having base, collector, and emitter electrodes with the feedback means being coupled from the emitter of the second transistor to the base of the third transistor, a series circuit including crystal means tuned to the operating frequency of the oscillator, the emitter of the third transistor being coupled with the base of the first transistor through the series circuit, the operating frequency being the frequency of the burst signal component, and a first capacitor having a capacitance equal to the capacitance of the crystal means coupling the collector of the third transistor with the base of the first transistor, and wherein the control means includes a capacitor and a detector connected in series between the collector of the second transistor and a point of reference potential, with the detector being coupled through an impedance with the base of the second transistor, the DC control potential applied by the detector to the base of the second transistor varying the bias thereon to thereby vary the gain thereof, so that with increased signal levels being passed by the first transistor, the gain of the second transistor is reduced and vice versa, the variable control voltage for the color band-pass amplifier being obtained from the collector of the second transistor and the signal level at the collector of the first transistor being substantially increased in the presence of burst signal components applied to the base of the third transistor.

* * * * *